(12) United States Patent
Derenne et al.

(10) Patent No.: US 11,612,527 B2
(45) Date of Patent: Mar. 28, 2023

(54) PATIENT TRANSPORT APPARATUS WITH AUXILIARY WHEEL SYSTEM

(71) Applicant: Stryker Corporation, Kalamazoo, MI (US)

(72) Inventors: Richard A. Derenne, Portage, MI (US); Gary L. Bartley, Kalamazoo, MI (US)

(73) Assignee: Stryker Corporation, Kalamazoo, MI (US)

( * ) Notice: Subject to any disclaimer, the term of this patent is extended or adjusted under 35 U.S.C. 154(b) by 0 days.

(21) Appl. No.: 17/695,132

(22) Filed: Mar. 15, 2022

(65) Prior Publication Data
US 2022/0202632 A1 Jun. 30, 2022

Related U.S. Application Data

(63) Continuation of application No. 16/690,227, filed on Nov. 21, 2019, now Pat. No. 11,304,860.
(Continued)

(51) Int. Cl.
*A61G 1/02* (2006.01)
*B60B 33/06* (2006.01)
*B60B 33/04* (2006.01)

(52) U.S. Cl.
CPC .......... *A61G 1/0268* (2013.01); *A61G 1/0237* (2013.01); *B60B 33/045* (2013.01); *B60B 33/066* (2013.01)

(58) Field of Classification Search
CPC ...... A61G 1/02; A61G 1/0268; A61G 1/0237; B60B 33/045; B60B 33/066
See application file for complete search history.

(56) References Cited

U.S. PATENT DOCUMENTS 4,534,433 A * 8/1985 Burbank ............... B60B 33/045
                                                          180/21
5,348,326 A    9/1994 Fullenkamp et al.
(Continued)

FOREIGN PATENT DOCUMENTS

WO    2005041837 A2    5/2005
WO    2016196403 A1    12/2016
(Continued)

*Primary Examiner* — Fredrick C Conley
(74) *Attorney, Agent, or Firm* — Howard & Howard Attorneys PLC

(57) ABSTRACT

A patient transport apparatus transports a patient over a floor surface. The patient transport apparatus comprises a support structure and support wheels coupled to the support structure. An auxiliary wheel is coupled to the support frame to influence motion of the patient transport apparatus over a floor surface. The auxiliary wheel is movable to a deployed position with the auxiliary wheel engaging the floor surface and a stowed position with the auxiliary wheel spaced a distance from the floor surface. An actuator assembly including a lift actuator a biasing device, and a biasing load adjustment assembly. The lift actuator is operable to move the auxiliary wheel to the deployed position and to the stowed position. The biasing device configured to bias the auxiliary wheel towards the deployed position. The biasing load adjustment assembly configured to adjust a biasing force being applied by the biasing device to the auxiliary wheel.

20 Claims, 11 Drawing Sheets

Related U.S. Application Data

(60) Provisional application No. 62/770,442, filed on Nov. 21, 2018.

(56) References Cited

U.S. PATENT DOCUMENTS

| | | | |
|---|---|---|---|
| 5,806,111 A | 9/1998 | Heimbrock | |
| 5,987,671 A | 11/1999 | Heimbrock et al. | |
| 6,016,580 A | 1/2000 | Heimbrock et al. | |
| 6,178,575 B1 | 1/2001 | Harada | |
| 6,286,165 B1 | 9/2001 | Heimbrock et al. | |
| 6,330,926 B1 | 12/2001 | Heimbrock et al. | |
| 6,505,359 B2 | 1/2003 | Heimbrock et al. | |
| 6,588,523 B2 | 7/2003 | Heimbrock et al. | |
| 6,598,247 B1 | 7/2003 | Heimbrock et al. | |
| 6,668,402 B2 | 12/2003 | Heimbrock | |
| 6,749,034 B2 | 6/2004 | Vogel et al. | |
| 6,752,224 B2 | 6/2004 | Hopper et al. | |
| 6,772,460 B2 | 8/2004 | Heimbrock et al. | |
| 6,792,630 B1 | 9/2004 | Palmatier | |
| 6,877,572 B2 | 4/2005 | Vogel et al. | |
| 6,902,019 B2 | 6/2005 | Heimbrock et al. | |
| 7,011,172 B2 | 3/2006 | Heimbrock et al. | |
| 7,014,000 B2 | 3/2006 | Kummer et al. | |
| 7,083,012 B2 | 8/2006 | Vogel et al. | |
| 7,090,041 B2 | 8/2006 | Vogel et al. | |
| 7,195,253 B2 | 3/2007 | Vogel et al. | |
| 7,273,115 B2 | 9/2007 | Kummer et al. | |
| 7,284,626 B2 | 10/2007 | Heimbrock et al. | |
| 7,302,717 B2 | 12/2007 | Reinke et al. | |
| 7,407,024 B2 | 8/2008 | Vogel et al. | |
| 7,419,019 B1 | 9/2008 | White et al. | |
| 7,530,412 B2 | 5/2009 | Heimbrock et al. | |
| 7,828,092 B2 | 11/2010 | Vogel et al. | |
| 7,882,582 B2 | 2/2011 | Kappeler et al. | |
| 7,886,377 B2 | 2/2011 | Hamberg et al. | |
| 7,896,118 B2 | 3/2011 | Williamson et al. | |
| 7,953,537 B2 | 5/2011 | Bhai | |
| 8,051,931 B2 | 11/2011 | Vogel et al. | |
| 8,109,525 B2 * | 2/2012 | Salus | A61G 7/08 180/209 |
| 8,122,535 B2 | 2/2012 | Hensley et al. | |
| 8,240,410 B2 | 8/2012 | Heimbrock et al. | |
| 8,260,517 B2 | 9/2012 | Bhai | |
| 8,267,206 B2 | 9/2012 | Vogel et al. | |
| 8,397,846 B2 | 3/2013 | Heimbrock et al. | |
| 8,474,073 B2 | 7/2013 | Hamberg et al. | |
| 8,746,710 B2 | 6/2014 | Schejbal | |
| 8,756,726 B2 | 6/2014 | Hamberg et al. | |
| 8,757,308 B2 | 6/2014 | Bhai et al. | |
| 8,781,677 B2 | 7/2014 | Roberts et al. | |
| 8,978,795 B2 | 3/2015 | Block et al. | |
| 9,271,887 B2 | 3/2016 | Schejbal | |
| 9,358,169 B2 | 6/2016 | Ottenweller et al. | |
| 9,707,143 B2 | 7/2017 | Thodupunuri et al. | |
| 9,931,259 B2 | 4/2018 | Ottenweller et al. | |
| 9,937,943 B2 | 4/2018 | Nilsson et al. | |
| 2003/0159861 A1 | 8/2003 | Hopper et al. | |
| 2005/0126835 A1 | 6/2005 | Lenkman | |
| 2006/0059623 A1 | 3/2006 | Karmer et al. | |
| 2007/0245488 A1 | 10/2007 | Zimbalista et al. | |
| 2008/0086815 A1 | 4/2008 | Kappeler et al. | |
| 2010/0181122 A1 | 7/2010 | Block et al. | |
| 2011/0277241 A1 | 11/2011 | Schejbal | |
| 2016/0136023 A1 | 5/2016 | Johnson et al. | |
| 2016/0137216 A1 | 5/2016 | Nilsson et al. | |
| 2016/0143796 A1 | 5/2016 | Jordan et al. | |
| 2016/0242978 A1 | 8/2016 | Jurka | |
| 2018/0168897 A1 | 6/2018 | Jonsson | |
| 2018/0185208 A1 | 7/2018 | Jonsson et al. | |
| 2020/0155384 A1 | 5/2020 | Derenne et al. | |

FOREIGN PATENT DOCUMENTS

| | | |
|---|---|---|
| WO | 2017001497 A1 | 1/2017 |
| WO | 2017151817 A1 | 9/2017 |
| WO | 2018210626 A1 | 11/2018 |

* cited by examiner

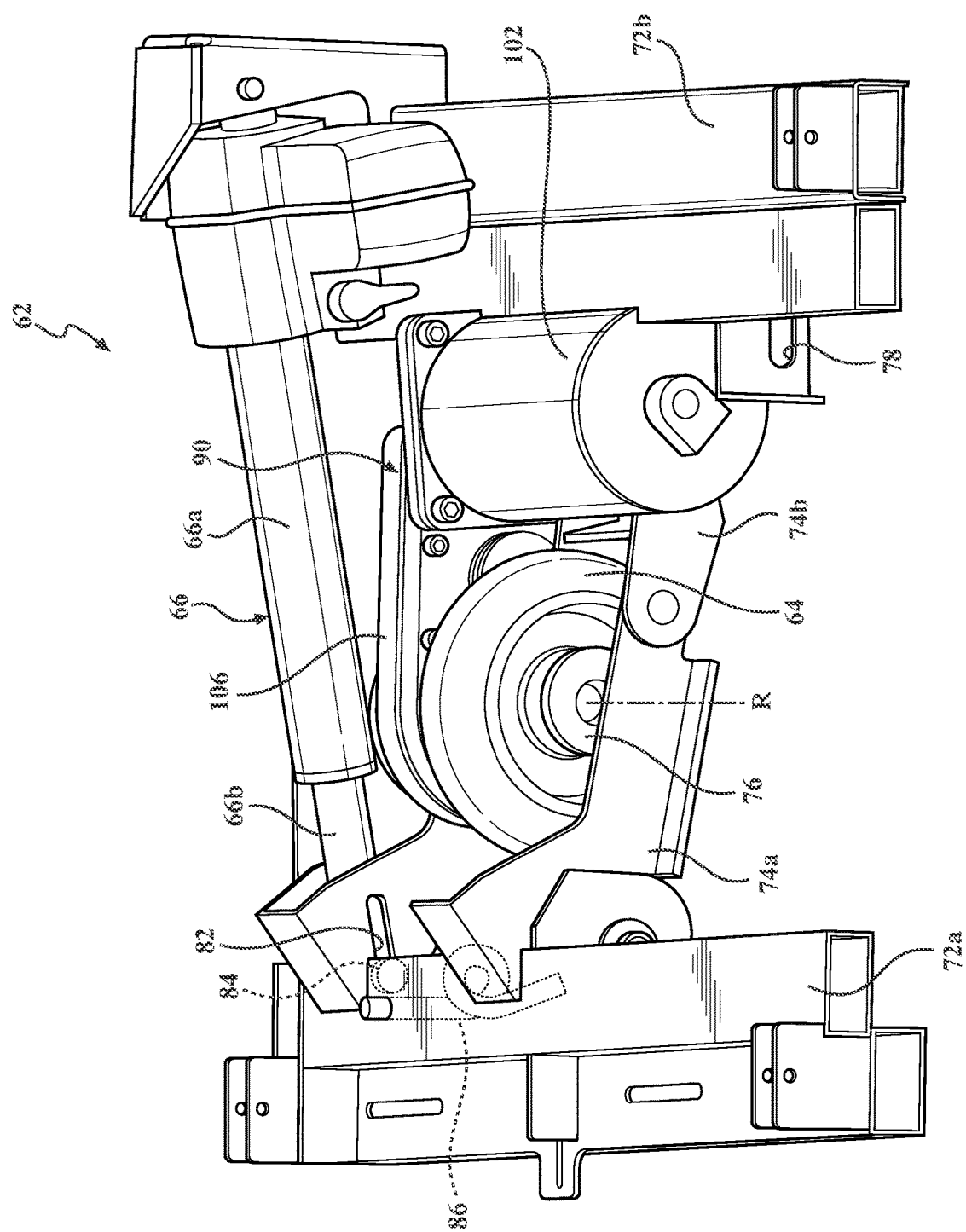

PATENT TRANSPORT APPARATUS WITH AUXILIARY WHEEL SYSTEM

CROSS-REFERENCE TO RELATED APPLICATIONS

The subject patent application is a Continuation of U.S. patent application Ser. No. 16/690,227, filed on Nov. 21, 2019, which claims priority to and all the benefits of U.S. Provisional Patent Application No. 62/770,442 filed on Nov. 21, 2018, the disclosures of each of which are hereby incorporated by reference in their entirety.

BACKGROUND

Patient transport systems facilitate care of patients in a health care setting. Patient transport systems comprise patient transport apparatuses such as, for example, hospital beds, stretchers, cots, tables, wheelchairs, and chairs to move patients between locations. A conventional patient transport apparatus comprises a base, a patient support surface, and several support wheels, such as four swiveling caster wheels. Often, the patient transport apparatus has an auxiliary wheel system that includes one or more non-swiveling auxiliary wheels, in addition to the four caster wheels. The auxiliary wheel, by virtue of its non-swiveling nature, is employed to help control movement of the patient transport apparatus over a floor surface in certain situations.

When a caregiver wishes to use the auxiliary wheel to help control movement of the patient transport apparatus, such as down long hallways or around corners, the caregiver operates an actuator assembly to selectively move the auxiliary wheel from a stowed position, out of contact with the floor surface, to a deployed position in contact with the floor surface. In addition, at least some known auxiliary wheel systems may include a biasing device that acts upon the auxiliary wheel to bias the auxiliary wheel downwardly toward the floor surface to maintain traction between the auxiliary wheel and the floor surface. In many cases, it's desirable to service the auxiliary wheel system for maintenance and repair. However, a service technician must safely remove the biasing device before performing maintenance on the actuator assembly and/or auxiliary wheel. The safe removal of these biasing devices may be time consuming and labor intensive, thus increasing the cost of maintaining known auxiliary wheel systems.

A patient transport apparatus designed to overcome one or more of the aforementioned challenges is desired.

BRIEF DESCRIPTION OF THE DRAWINGS

FIG. 3A is a perspective view of the auxiliary wheel assembly comprising an auxiliary wheel and a lift actuator.

DETAILED DESCRIPTION OF THE EMBODIMENTS

Figure 1:
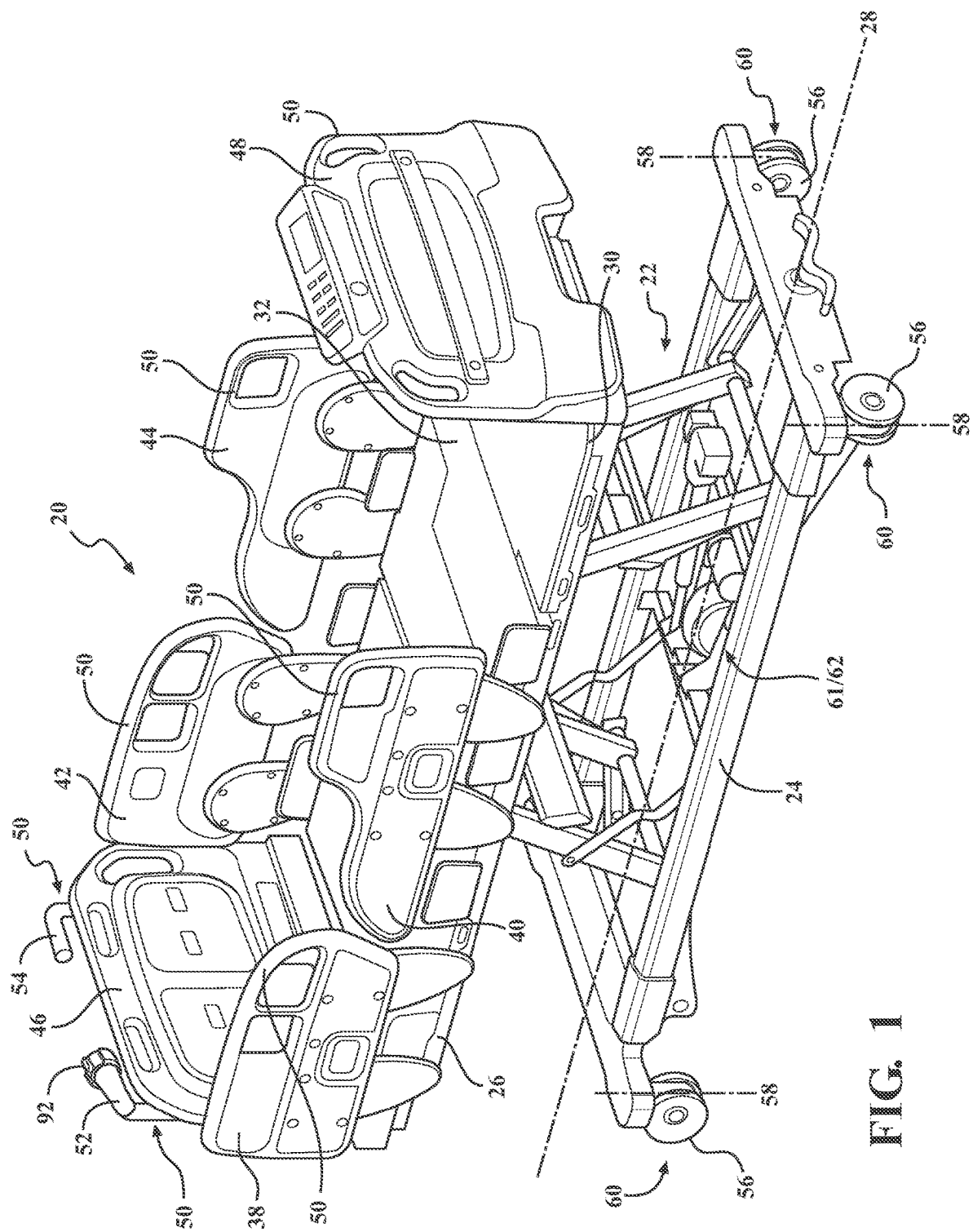
FIG. 1 is a perspective view of a patient transport apparatus.

Referring to FIG. 1, a patient transport system comprising a patient transport apparatus 20 is shown for supporting a patient in a health care setting. The patient transport apparatus 20 illustrated in FIG. 1 comprises a hospital bed. In other embodiments, however, the patient transport apparatus 20 may comprise a cot, table, wheelchair, chair, or similar apparatus, utilized in the care of a patient to transport the patient between locations.

A support structure 22 provides support for the patient. The support structure 22 illustrated in FIG. 1 comprises a base 24 and an intermediate frame 26. The base 24 defines a longitudinal axis 28 from a head end to a foot end. The intermediate frame 26 is spaced above the base 24. The support structure 22 also comprises a patient support deck 30 disposed on the intermediate frame 26. The patient support deck 30 comprises several sections, some of which articulate (e.g., pivot) relative to the intermediate frame 26, such as a fowler section, a seat section, a thigh section, and a foot section. The patient support deck 30 provides a patient support surface 32 upon which the patient is supported.

A mattress, although not shown, may be disposed on the patient support deck 30. The mattress comprises a secondary patient support surface upon which the patient is supported. The base 24, intermediate frame 26, patient support deck 30, and patient support surface 32 each have a head end and a foot end corresponding to designated placement of the patient's head and feet on the patient transport apparatus 20. The construction of the support structure 22 may take on any known or conventional design, and is not limited to that specifically set forth above. In addition, the mattress may be omitted in certain embodiments, such that the patient rests directly on the patient support surface 32.

Side rails 38, 40, 42, 44 are supported by the base 24. A first side rail 38 is positioned at a right head end of the intermediate frame 26. A second side rail 40 is positioned at a right foot end of the intermediate frame 26. A third side rail 42 is positioned at a left head end of the intermediate frame 26. A fourth side rail 44 is positioned at a left foot end of the intermediate frame 26. If the patient transport apparatus 20 is a stretcher, there may be fewer side rails. The side rails 38, 40, 42, 44 are movable between a raised position in which they block ingress and egress into and out of the patient transport apparatus 20 and a lowered position in which they are not an obstacle to such ingress and egress. The side rails 38, 40, 42, 44 may also be movable to one or more intermediate positions between the raised position and the lowered position. In still other configurations, the patient transport apparatus 20 may not comprise any side rails.

A headboard 46 and a footboard 48 are coupled to the intermediate frame 26. In other embodiments, when the headboard 46 and footboard 48 are provided, the headboard 46 and footboard 48 may be coupled to other locations on the patient transport apparatus 20, such as the base 24. In still other embodiments, the patient transport apparatus 20 does not comprise the headboard 46 and/or the footboard 48.

User interfaces 50, such as handles, are shown integrated into the footboard 48 and side rails 38, 40, 42, 44 to facilitate movement of the patient transport apparatus 20 over floor surfaces. Additional user interfaces 50 may be integrated into the headboard 46 and/or other components of the patient transport apparatus 20. The user interfaces 50 are graspable by the user to manipulate the patient transport apparatus 20 for movement.

Other forms of the user interface 50 are also contemplated. The user interface 50 may simply be a surface on the patient transport apparatus 20 upon which the user logically applies force to cause movement of the patient transport apparatus 20 in one or more directions, also referred to as a push location. This may comprise one or more surfaces on the intermediate frame 26 or base 24. This could also comprise one or more surfaces on or adjacent to the headboard 46, footboard 48, and/or side rails 38, 40, 42, 44.

In the embodiment shown, one set of user interfaces 50 comprises a first handle 52 and a second handle 54. The first and second handles 52, 54 are coupled to the intermediate frame 26 proximal to the head end of the intermediate frame 26 and on opposite sides of the intermediate frame 26 so that the user may grasp the first handle 52 with one hand and the second handle 54 with the other. In other embodiments, the user interfaces 50 comprise one or more of a joystick, dial, or knob in place of the first and second handles 52, 54.

Support wheels 56 are coupled to the base 24 to support the base 24 on a floor surface such as a hospital floor. The support wheels 56 allow the patient transport apparatus 20 to move in any direction along the floor surface by swiveling to assume a trailing orientation relative to a desired direction of movement. In the embodiment shown, the support wheels 56 comprise four support wheels each arranged in corners of the base 24. The support wheels 56 shown are caster wheels able to rotate and swivel about swivel axes 58 during transport. Each of the support wheels 56 forms part of a caster assembly 60. Each caster assembly 60 is mounted to the base 24. It should be understood that various configurations of the caster assemblies 60 are contemplated. In addition, in some embodiments, the support wheels 56 are not caster wheels and may be non-steerable, steerable, non-powered, powered, or combinations thereof. Additional support wheels 56 are also contemplated.

Figure 2:
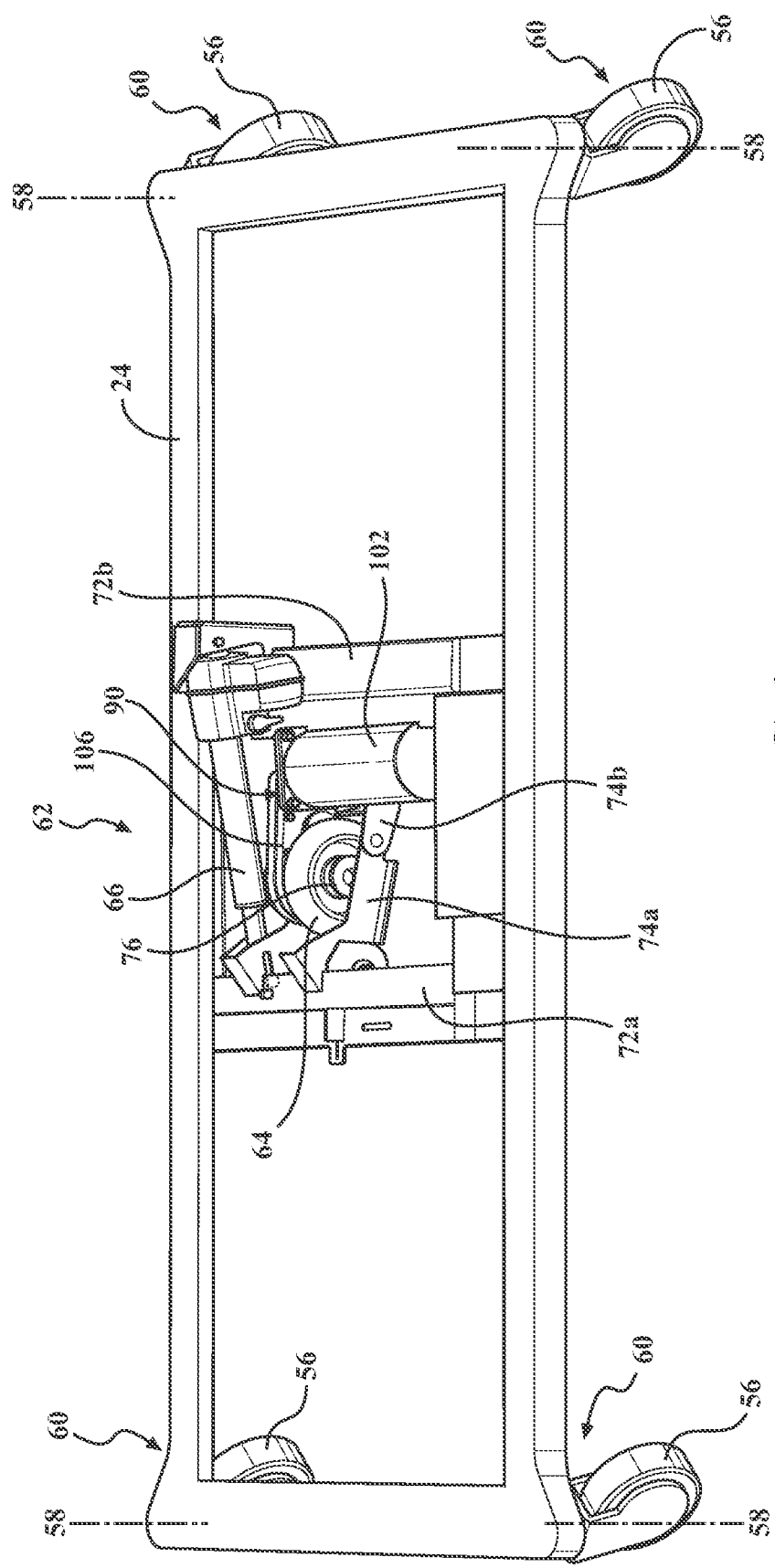
FIG. 2 is a perspective view of an auxiliary wheel assembly of the patient transport apparatus coupled to a base of the patient transport apparatus.

Referring to FIGS. 1 and 2, in the illustrated embodiment, the patient transport apparatus 20 includes an auxiliary wheel system 61 that is coupled to the support structure 22. The auxiliary wheel system 61 includes an auxiliary wheel assembly 62 that is coupled to the base 24. The auxiliary wheel assembly 62 influences motion of the patient transport apparatus 20 during transportation over the floor surface. The auxiliary wheel assembly 62 comprises an auxiliary wheel 64 and a lift actuator 66 operatively coupled to the auxiliary wheel 64. The lift actuator 66 is operable to move the auxiliary wheel 64 between a deployed position 68 (see FIG. 6) engaging the floor surface and stowed positions 70a, 70b (see FIGS. 4 and 5) spaced away from and out of contact with the floor surface. The auxiliary wheel 64 influences motion of the patient transport apparatus 20 during transportation over the floor surface when the auxiliary wheel 64 is in the deployed position 68. In some embodiments, the auxiliary wheel assembly 62 comprises an additional auxiliary wheel movable with the auxiliary wheel 64 between the deployed position 68 and stowed positions 70a, 70b via the lift actuator 66.

By deploying the auxiliary wheel 64 on the floor surface, the patient transport apparatus 20 can be easily moved down long, straight hallways or around corners, owing to a non-swiveling nature of the auxiliary wheel 64. When the auxiliary wheel 64 is stowed (see FIGS. 4 and 5), the patient transport apparatus 20 is subject to moving in an undesired direction due to uncontrollable swiveling of the support wheels 56. For instance, during movement down long, straight hallways, the patient transport apparatus 20 may be susceptible to "dog tracking," which refers to undesirable sideways movement of the patient transport apparatus 20. Additionally, when cornering, without the auxiliary wheel 64 deployed, and with all of the support wheels 56 able to swivel, there is no wheel assisting with steering through the corner, unless one or more of the support wheels 56 are provided with steer lock capability and the steer lock is activated.

The auxiliary wheel 64 may be arranged parallel to the longitudinal axis 28 of the base 24. Said differently, the auxiliary wheel 64 rotates about a rotational axis R (see FIG. 3A) oriented perpendicularly to the longitudinal axis 28 of the base 24 (albeit offset in some cases from the longitudinal axis 28). In the embodiment shown, the auxiliary wheel 64 is incapable of swiveling about a swivel axis. In other embodiments, the auxiliary wheel 64 may be capable of swiveling, but can be locked in a steer lock position in which the auxiliary wheel 64 is locked to solely rotate about the rotational axis R oriented perpendicularly to the longitudinal axis 28. In still other embodiments, the auxiliary wheel 64 may be able to freely swivel without any steer lock functionality.

The auxiliary wheel 64 may be located to be deployed inside a perimeter of the base 24 and/or within a support wheel perimeter defined by the swivel axes 58 of the support wheels 56. In some embodiments, such as those employing a single auxiliary wheel 64, the auxiliary wheel 64 may be located near a center of the support wheel perimeter, or offset from the center. In this case, the auxiliary wheel 64 may also be referred to as a fifth wheel. In other embodiments, the auxiliary wheel 64 may be disposed along the support wheel perimeter or outside of the support wheel perimeter. In the embodiment shown, the auxiliary wheel 64 has a diameter larger than a diameter of the support wheels 56. In other embodiments, the auxiliary wheel 64 may have the same or a smaller diameter than the support wheels 56.

Figure 3B:
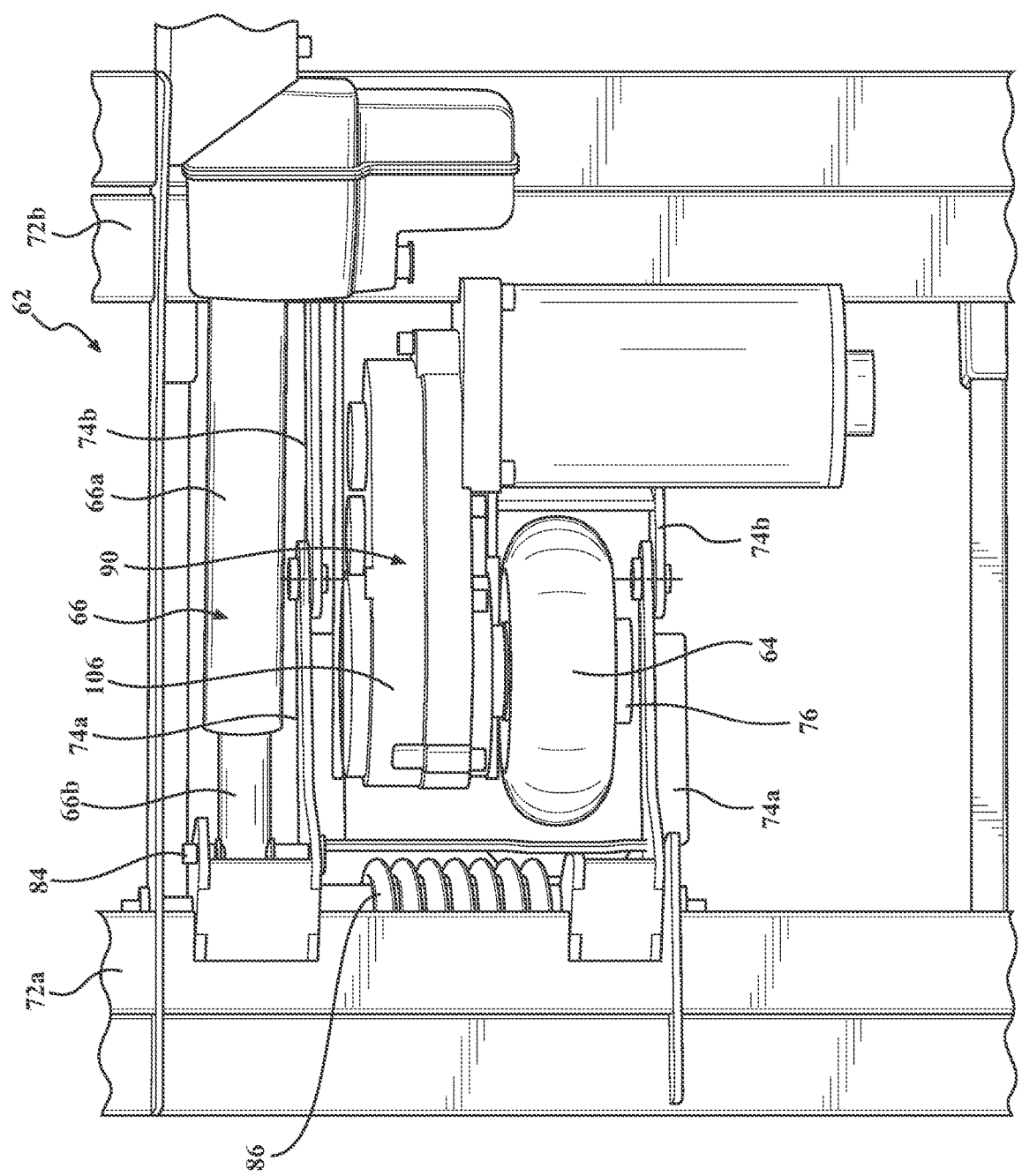
FIG. 3B is a plan view of the auxiliary wheel assembly comprising the auxiliary wheel and the lift actuator.

In one embodiment shown in FIGS. 2-3B, the base 24 comprises a first cross-member 72a and a second cross-member 72b. The auxiliary wheel assembly 62 is disposed between and coupled to the cross-members 72a, 72b. The auxiliary wheel assembly 62 comprises a first auxiliary wheel support frame 74a coupled to and arrange to articulate (e.g. pivot) relative to the first cross-member 72a. The auxiliary wheel assembly 62 further comprises a second auxiliary wheel support frame 74b pivotably coupled to the first auxiliary wheel support frame 74a and the second cross-member 72b. The second auxiliary wheel support frame 74b is arranged to articulate and translate relative to the second cross-member 72b. The second cross-member 72b defines a slot 78 for receiving a pin 80 (see FIGS. 4-6) connected to the second auxiliary wheel support frame 74b to permit the second auxiliary wheel support frame 74b to translate and pivot relative to the second cross-member 72b.

In some embodiments, as shown in FIGS. 3A and 3B, the auxiliary wheel assembly 62 comprises an auxiliary wheel drive system 90 (described in more detail below) operatively coupled to the auxiliary wheel 64. The auxiliary wheel drive system 90 is configured to drive (e.g. rotate) the auxiliary wheel 64. In the embodiment shown, the auxiliary wheel drive system 90 comprises a motor 102 coupled to a power source 104 (shown schematically in FIG. 9) and the second auxiliary wheel support frame 74b. The auxiliary wheel drive system 90 further comprises a gear train 106 coupled to the motor 102 and an axle 76 of the auxiliary wheel 64. In the embodiment shown, the auxiliary wheel 64, the gear train 106, and the motor 102 are arranged and supported by the second auxiliary wheel support frame 74b to articulate and translate with the second auxiliary wheel support frame 74b relative to the second cross-member 72b. In other embodiments, the axle 76 of the auxiliary wheel 64 is coupled directly to the second auxiliary wheel support frame 74b.

Energy is provided from the power source 104 to energize the motor 102. The motor 102 converts energy from the power source 104 to torque supplied to the gear train 106. The gear train 106 transfers torque to the auxiliary wheel 64 to rotate the auxiliary wheel 64.

In the embodiment shown, the lift actuator 66 is a linear actuator comprising a housing 66a and a drive rod 66b extending from the housing 66a. The drive rod 66b has a proximal end received in the housing 66a and a distal end spaced from the housing 66a. The distal end of the drive rod 66b is configured to be movable relative to the housing 66a to extend and retract an overall length of the lift actuator 66. The housing 66a is pivotally coupled to the second cross-member 72b and the distal end of the drive rod 66b is coupled to the first auxiliary wheel support frame 74a. More specifically, the first auxiliary wheel support frame 74a defines a slot 82 to receive a pin 84 connected to the distal end of the drive rod 66b to permit the drive rod 66b to translate and pivot relative to the first auxiliary wheel support frame 74a.

Figure 6:
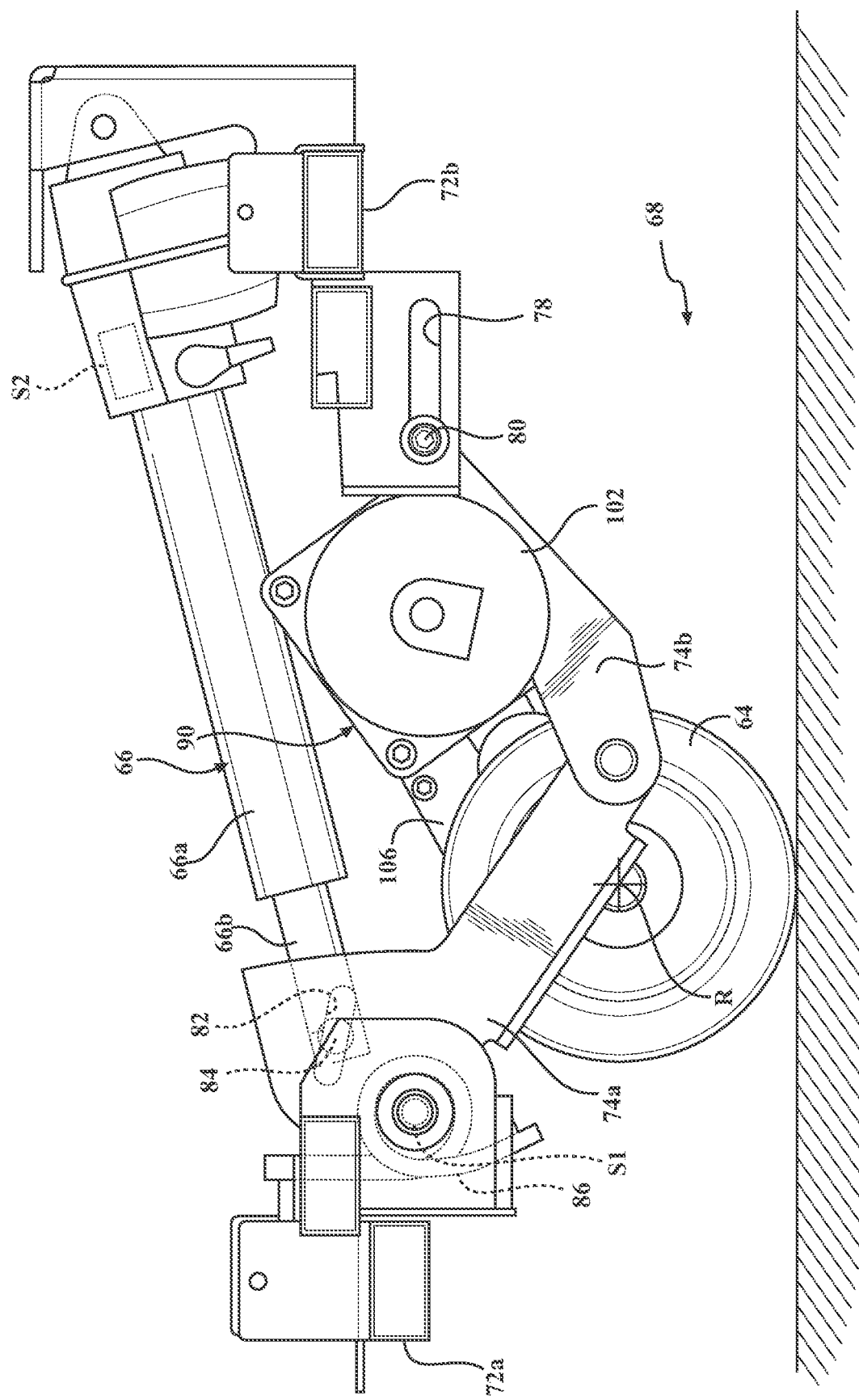
FIG. 6 is an elevational view of the auxiliary wheel in a third position.

In the embodiment shown, the auxiliary wheel assembly 62 comprises a biasing device such as a torsion spring 86 to apply a biasing force to bias the first and second auxiliary wheel support frames 74a, 74b toward the floor surface and thus move the auxiliary wheel 64 toward the deployed position 68 (see FIG. 6). The pin 84 at the distal end of the drive rod 66b abuts a first end of the slot 82 to limit the distance the torsion spring 86 would otherwise rotate the first auxiliary wheel support frame 74a toward the floor surface. Thus, even though the torsion spring 86 applies the force that ultimately causes the auxiliary wheel 64 to move to the floor surface in the deployed position 68, the lift actuator 66 is operable to move the auxiliary wheel 64 to the deployed position 68 and the stowed positions 70a, 70b, or any other position.

In the embodiment shown, in the deployed position 68 of FIG. 6, the lift actuator 66 is controlled so that the pin 84 is located centrally in the slot 82 to permit the auxiliary wheel 64 to move away from the floor surface when encountering an obstacle and to dip lower when encountering a low spot in the floor surface. For instance, when the auxiliary wheel 64 encounters an obstacle, the auxiliary wheel 64 moves up to avoid the obstacle and the pin 84 moves toward a second end of the slot 82 against the biasing force from the torsion spring 86 without changing the overall length of the lift actuator 66. Conversely, when the auxiliary wheel 64 encounters a low spot in the floor surface, the auxiliary wheel 64 is able to travel lower to maintain traction with the floor surface and the pin 84 moves toward the first end of the slot 82 via the biasing force from the torsion spring 86 without changing the overall length of the lift actuator 66.

Referring to FIG. 3B, the first and second auxiliary wheel support frames 74a, 74b each comprise first arms pivotably coupled to each other on one side of the auxiliary wheel 64 (as shown in FIG. 3A) and second arms pivotably coupled to each other on the other side of the auxiliary wheel 64. The first and second arms are pivotably connected by pivot pins. The first and second arms of the first auxiliary wheel support frame 74a are rigidly connected to each other such that the first and second arms of the first auxiliary wheel support frame 74a articulate together relative to the first cross-member 72a. The first and second arms of the second auxiliary wheel support frame 74b are rigidly connected to each other such that the first and second arms of the second auxiliary wheel support frame 74b articulate and translate together relative to the second cross-member 72b. The second cross-member 72b defines another slot 78 for receiving another pin 80 connected to the second auxiliary wheel support frame 74b (one for each arm). The respective first and second arms of the first and second auxiliary wheel support frames 74a, 74b cooperate to balance the force applied by the auxiliary wheel 64 against the floor surface.

Figure 4:
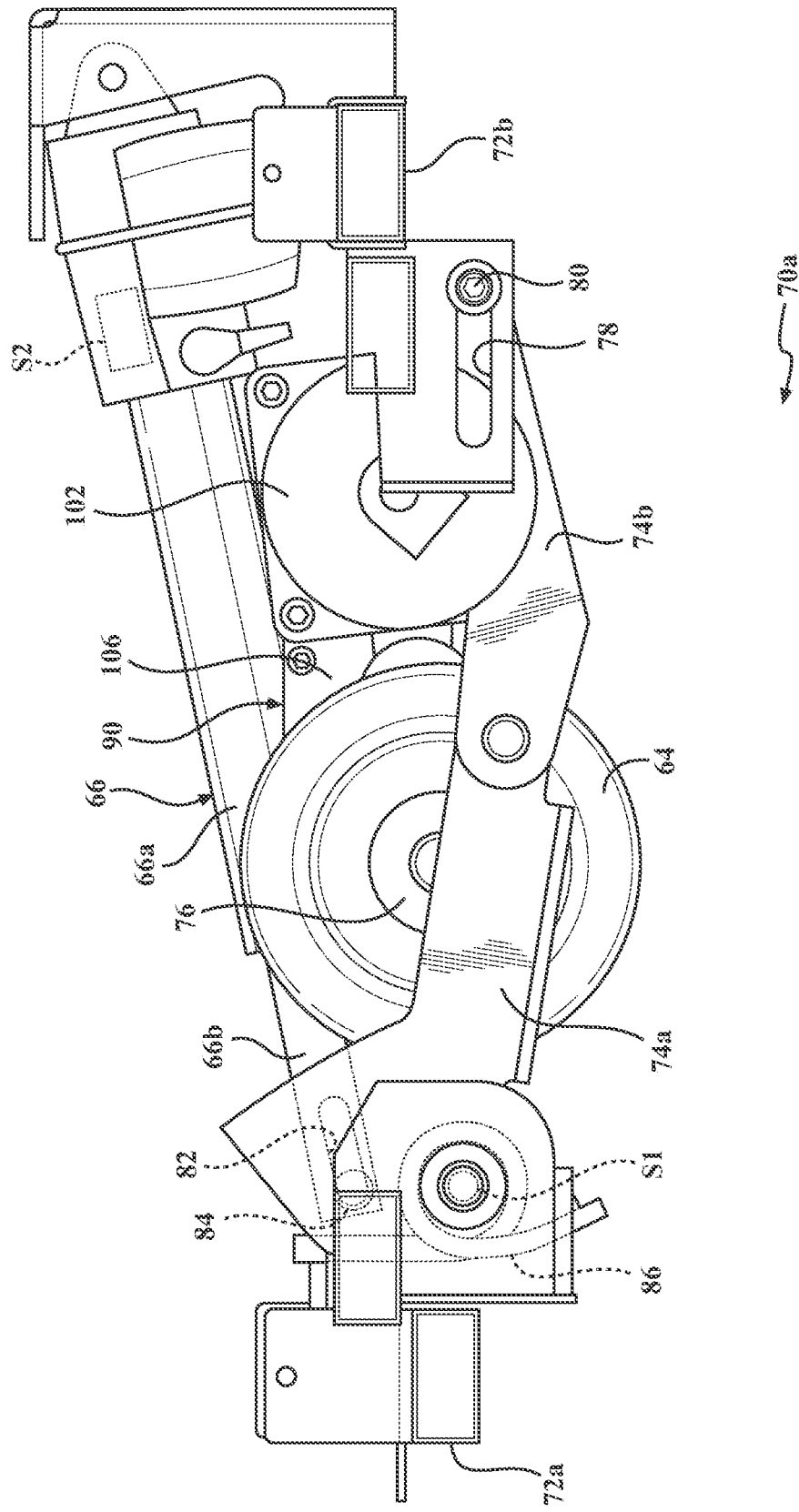
FIG. 4 is an elevational view of the auxiliary wheel in a first position.
Figure 5:
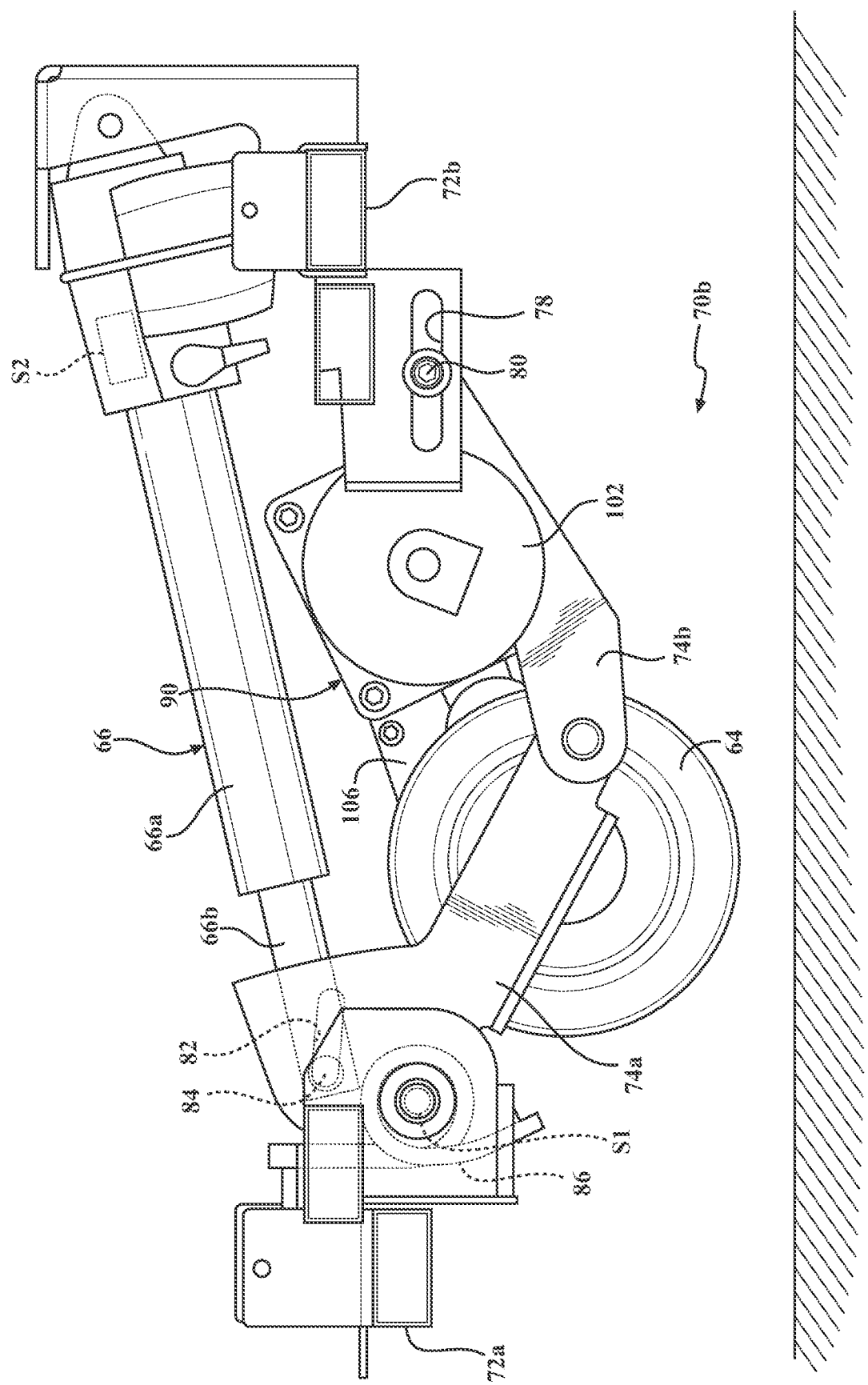
FIG. 5 is an elevational view of the auxiliary wheel in a second position.

Referring to FIGS. 4 and 5, the auxiliary wheel 64 is in one stowed position spaced from the floor surface. FIG. 4 illustrates one embodiment of the auxiliary wheel 64 being in a fully stowed position 70a and FIG. 5 illustrates one embodiment of the auxiliary wheel 64 being in a partially stowed position 70b. In the stowed positions 70a, 70b, the lift actuator 66 applies a force against the biasing force of the torsion spring 86 to retain a spaced relationship of the auxiliary wheel 64 with the floor surface. To move the auxiliary wheel 64 to the deployed position 68 (see FIG. 6), the distal end of the drive rod 66b is configured to retract into the housing 66a, which permits the biasing force of the torsion spring 86 to rotate the first auxiliary wheel support frame 74a, the second auxiliary wheel support frame 74b, and the auxiliary wheel 64 toward the floor surface. The second auxiliary wheel support frame 74b is configured to rotate relative to the first auxiliary wheel support frame 74a by virtue of the second auxiliary wheel support frame 74b being pivotably coupled to the first auxiliary wheel support frame 74a (via a pinned connection therebetween) and pivotably and slidably coupled to the second cross-member 72b. In other words, the slot 78 of the second cross-member 72b permits the pin 80, and thus the second auxiliary wheel support frame 74b to move toward the first cross-member 72a. To return the auxiliary wheel 64 to the stowed position, the lift actuator 66 is configured to apply a force greater than the biasing force of the torsion spring 86 to move the auxiliary wheel 64 away from the floor surface.

Referring to FIG. 6, the auxiliary wheel 64 is in the deployed position 68 engaging the floor surface. In this embodiment, the overall length of the lift actuator 66 is shorter when the auxiliary wheel 64 is in the deployed position 68 than when the auxiliary wheel 64 is in the stowed positions 70a, 70b.

Although an exemplary embodiment of an auxiliary wheel assembly 62 is described above and shown in the figures, it should be appreciated that other configurations employing a lift actuator 66 to move the auxiliary wheel 64 between the stowed positions 70a, 70b and deployed position 68 are contemplated.

In some embodiments, the lift actuator 66 is configured to cease application of force against the biasing force of the torsion spring 86 instantly to permit the torsion spring 86 to move the auxiliary wheel 64 to the deployed position 68 expeditiously. In one embodiment, the auxiliary wheel 64 moves from the fully stowed position 70a to the deployed position 68 in less than three seconds. In another embodiment, the auxiliary wheel 64 moves from the fully stowed position 70a to the deployed position 68 in less than two seconds. In still other embodiments, the auxiliary wheel 64 moves from the fully stowed position 70a to the deployed position 68 in less than one second. A suitable actuator for the lift actuator 66 comprises a linear actuator supplied by LINAK A/S located at Smedevenget 8, Guderup, DK-6430, Nordborg, Denmark. It is contemplated that any suitable actuator capable of deploying the auxiliary wheel 64 may be utilized.

Referring to FIGS. 7-10, as an example, a motorized wheel in the center of a 500 lb patient transport apparatus 20 needs 150-200 lbs of normal force against the floor surface with a rubber 6" auxiliary wheel to provide the proper traction to drive the patient transport apparatus 20 up a 6 degree ramp. This type of force typically requires a high-force spring to apply the load and provide enough travel in the wheel mechanism to account for bumps or valleys in the floor surface. With that type of high-force spring, it can be challenging to assemble or service the sub-assembly.

To solve these problems, the patient transport apparatus 20 includes a biasing load adjustment assembly 110 that is configured to adjust a biasing force being applied by the biasing device. In some embodiments, the biasing load adjustment assembly 110 includes a component that can be moved with a bolt to add or relieve the load on the spring. In addition, the biasing load adjustment assembly 110 may include holes in one or more moving components where a pin, bolt, or tool can be used to hold the moving parts in place while a service technician is working on the sub-assembly or removing components. In some embodiments, the biasing load adjustment assembly 110 includes a bolt/nut that can be adjusted to relieve the load off of the actuator holding the spring force to allow a service technician to remove the actuator from the sub-assembly.

Referring to FIGS. 7-10, in the illustrated embodiments, the auxiliary wheel assembly 62 includes a biasing load adjustment assembly 110 that is configured to adjust a biasing force being applied by the torsion spring 86 to the auxiliary wheel 64. The torsion spring 86 is in contact with the wheel support frame 74a to bias the wheel support frame 74a away from the base 24 and to bias the auxiliary wheel 64 to the deployed position 68. The wheel support frame 74a is coupled to the first cross-member 72a and to the auxiliary wheel 64 for moving the auxiliary wheel 64 between the stowed position 70a and the deployed position 68.

Figure 7:
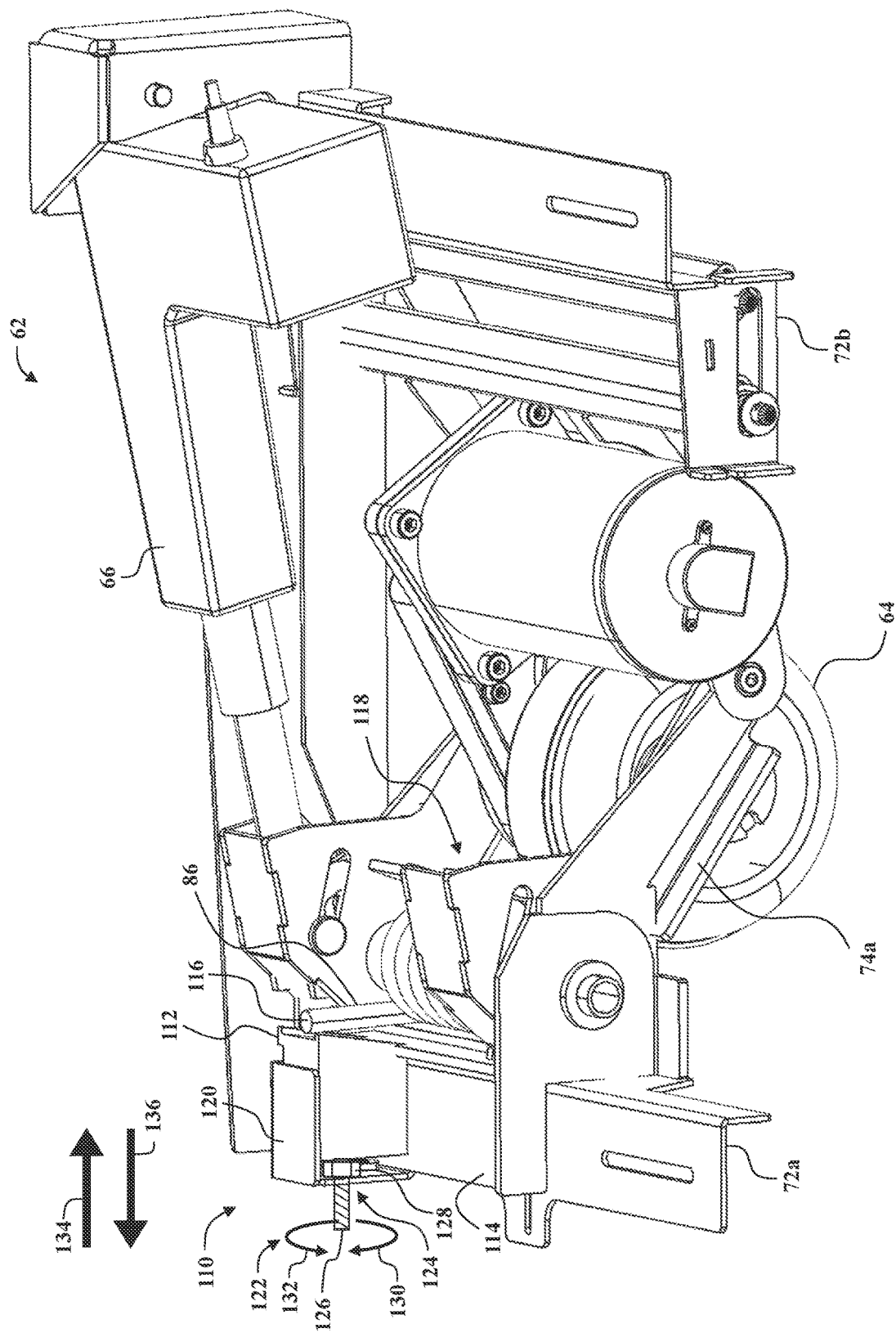
FIGS. 7-10 are perspective views of the auxiliary wheel assembly comprising a biasing load adjustment assembly.

Referring to FIG. 7, in some embodiments, the biasing load adjustment assembly 110 includes a slider block 112 that is slideably coupled to the first cross-member 72a. The slider block 112 is positionable along an outer surface 114 of the first cross-member 72a and is configured to contact the torsion spring 86 to adjust a load imparted on the wheel support frame 74a by the torsion spring 86. The torsion spring 86 extends between a first end 116 and a second end 118. The first end 116 is positioned in contact with the slider block 112 and the second end 118 positioning in contact with the wheel support frame 74a.

The biasing load adjustment assembly 110 also includes a positioning bracket 120 and a positioning assembly 122. The positioning bracket 120 is coupled to the first cross-member 72a and extends outwardly from the outer surface 114 of the first cross-member 72a. The positioning assembly 122 is coupled to the positioning bracket 120 and to the slider block 112. The positioning assembly 122 is configured to adjust a position of the slider block 112 relative to the torsion spring 86 to facilitate adjusting the load imparted on the wheel support frame 74a by the torsion spring 86.

The positioning bracket 120 includes a positioning opening 124 that extends through an outer surface of the positioning bracket 120 and is sized and shaped to receive the positioning assembly 122 therethrough. The positioning assembly 122 extends through the positioning opening 124 to contact the slider block 112. The positioning assembly 122 includes a positioning bolt 126 that extends through the positioning opening 124. The positioning bolt 126 is coupled to the slider block 112 such that a linear movement of the positioning bolt 126 causes a movement of the slider block 112 along the outer surface 114 of the first cross-member 72a.

The positioning assembly 122 also includes a positioning nut 128 that is rotatably coupled to the positioning bolt 126 to adjust a position of the positioning bolt 126 with respect to the positioning bracket 120. The positioning bolt 126 includes a threaded outer surface. The positioning nut 128 is threadably coupled to the positioning bolt 126 and is configured to contact the positioning bracket 120 such that a rotation of the positioning bolt 126 causes a linear movement of the positioning bolt 126. For example, a rotation of the positioning nut 128 in a first rotational direction 130 moves the positioning bolt 126 towards the torsion spring 86 and a rotation of the positioning nut 128 in a second rotational direction 132 moves the positioning bolt 126 away from the torsion spring 86. The slider block 112 is movable along the outer surface 114 of the first cross-member 72a in a first linear direction 134 towards the torsion spring 86 and a second opposite linear direction 136 away from the torsion spring 86. The rotation of the positioning nut 128 in the first rotational direction 130 moves the slider block 112 in the first linear direction 134 towards the torsion spring 86. The rotation of the positioning nut 128 in the second rotational direction 132 moves the slider block 112 in the second opposite linear direction 136 away from the torsion spring 86.

During operation, an operator may rotate the positioning nut 128 in the first rotational direction 130 to move the positioning bolt 126 and slider block 112 in the first linear direction 134 to contact the first end 116 of torsion spring 86 and increase a biasing force imparted by the torsion spring 86 onto the wheel support frame 74a and the lift actuator 66. In addition, when the operator desired to perform maintenance of the lift actuator 66, the operator may rotate the positioning nut 128 in the second rotational direction 132 to move the positioning bolt 126 and the slider block 112 in the second opposite linear direction 136 away from the torsion spring 86 to reduce the biasing load of the torsion spring on the wheel support frame 74a and lift actuator 66.

Figure 8:
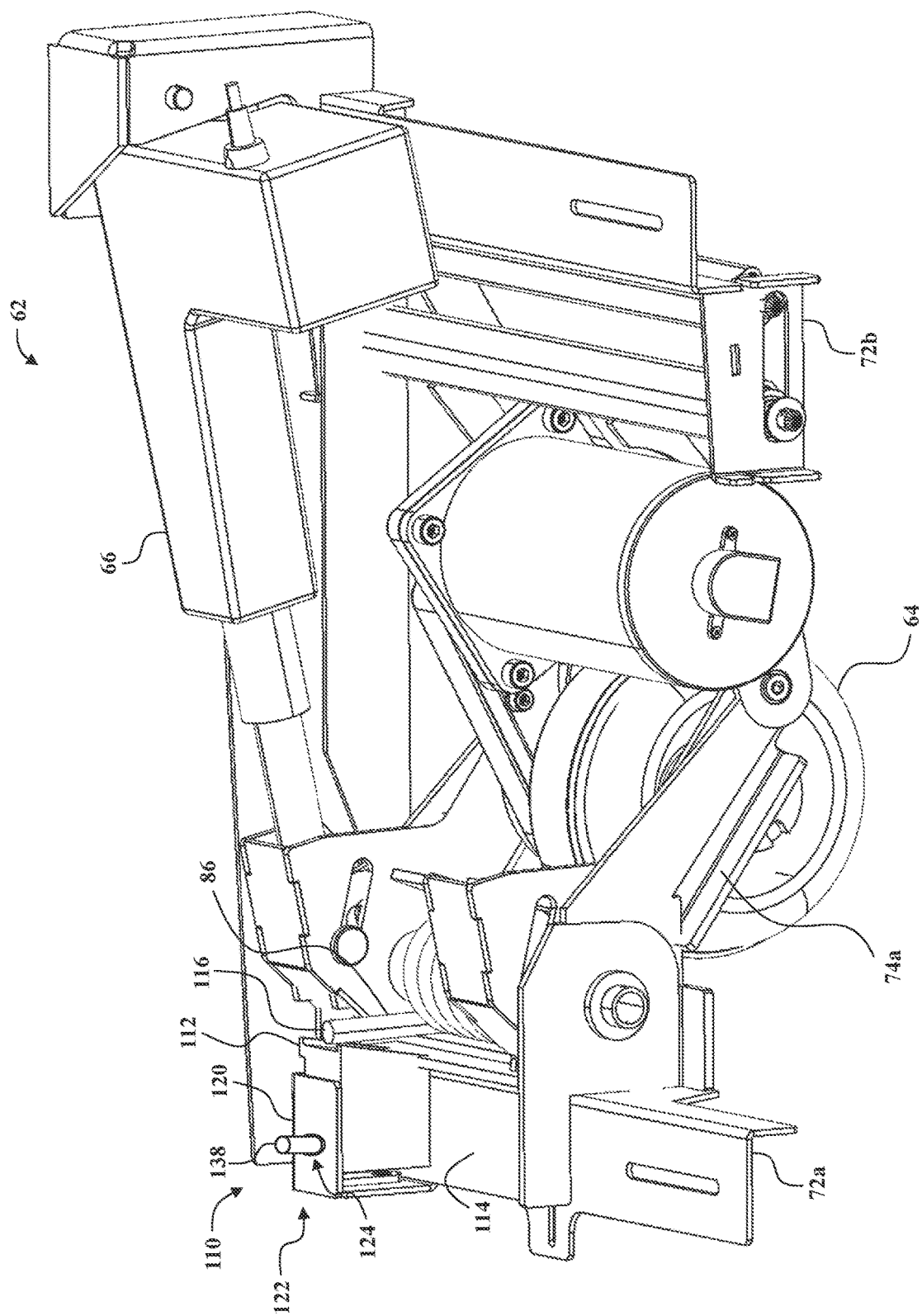

Referring to FIG. 8, in some embodiments, the positioning assembly 122 may include a positioning pin 138 that is inserted through the positioning opening 124 to contact the slider block 112 to maintain a position of the slider block 112 with respect to the torsion spring 86. The positioning pin 138 may be removable to allow an operator to remove the positioning pin 138 to allow the slider block 112 to move away from the torsion spring 86 to reduce the biasing force being applied by the torsion spring 86.

Figure 9:
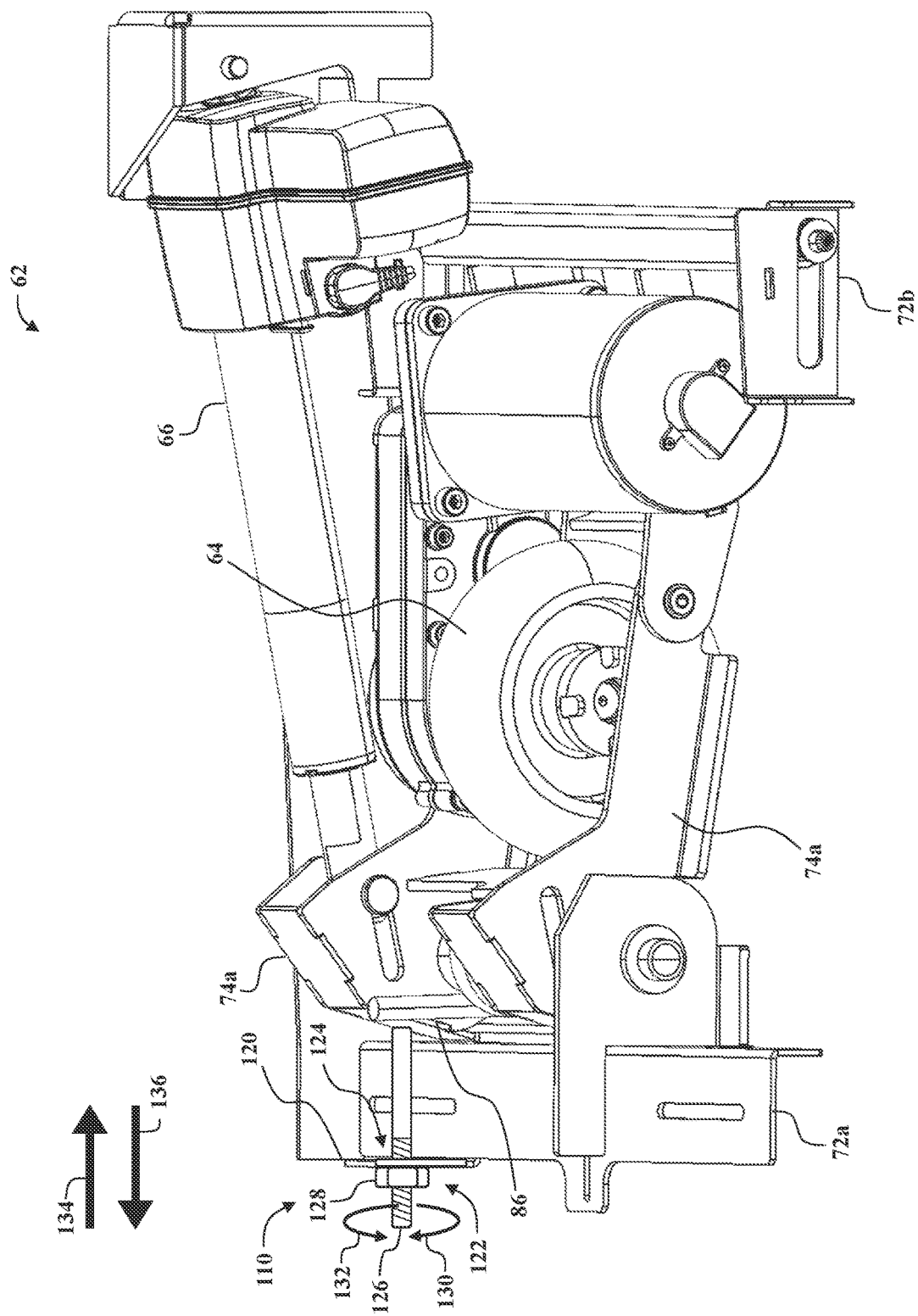

Referring to FIG. 9, in some embodiments, the positioning assembly 122 is coupled to the positioning bracket 120 and to the wheel support frame 74a for holding a position of the wheel support frame 74a with respect to the first cross-member 72a. The positioning assembly 122 includes the positioning bolt 126 extending through the positioning opening 124 and coupled to the wheel support frame 74a such that a movement of the wheel support frame 74a causes a movement of the positioning bolt 126. The positioning bolt 126 extends to a distal end connected to the wheel support frame 74a in any suitable manner. The distal end may be connected via a joint, such as a ball and socket joint, pivot joint, sliding joint, or the like. The connection only needs to be able to transmit a force on the positioning bolt 126 to the wheel support frame 74a so that movement of the positioning bolt 126 causes movement of the wheel support frame 74a.

The positioning nut 128 is rotatably coupled to the positioning bolt 126 to adjust a position of the positioning bolt 126 with respect to the positioning bracket 120. In the illustrated embodiment, the positioning nut 128 is threadably coupled to the threaded outer surface of the positioning bolt 126 such that a rotation of the positioning nut 128 in the first rotational direction 130 moves the wheel support frame 74a in the first linear direction 134 away the first cross-member 72a by virtue of the force from the torsion spring 86, and a rotation of the positioning nut 128 in the second rotational direction 132 moves the wheel support frame 74a in the second opposite linear direction 136 towards the first cross-member 72a, similar to how the wheel support frame 74a moves when stowing the auxiliary wheel 64. The positioning assembly 122 is employed to hold the wheel support frame 74a against movement toward the deployed position that could otherwise be caused by the torsion spring 86. Accordingly, with the positioning bolt 126 being connected to the wheel support frame 74a and the positioning nut 128 being tightened, the wheel support frame 74a can be held in its position shown in FIG. 9 and the actuator 66 can be removed for service. Once service is complete, the positioning nut 128 can be loosened enough so that the wheel support frame 74a is able to move normally to the deployed position.

Figure 10:
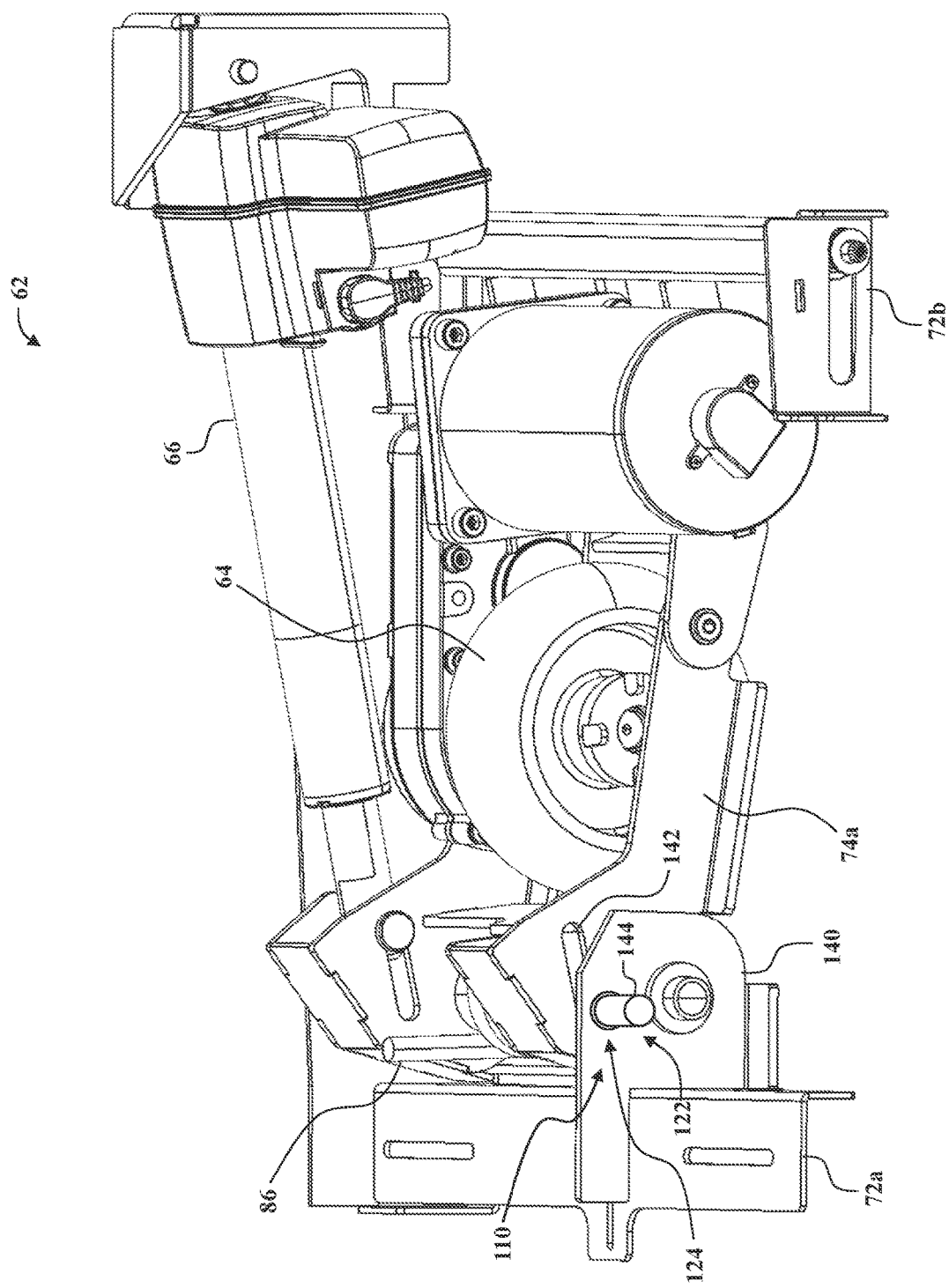

Referring to FIG. 10, in some embodiments, the biasing load adjustment assembly 110 includes a support bracket 140 that extends outwardly from the first cross-member 72a towards the wheel support frame 74a. The support bracket 140 includes a positioning opening 124 that extends through an outer surface of the support bracket 140. The wheel support frame 74a includes a positioning slot 142 that is orientated with respect to the positioning opening 124 such that a tool 144 (e.g., pin, screwdriver, or other interference device) may be removably inserted through the positioning opening 124 and the positioning slot 142 to prevent a movement of the wheel support frame 74a with respect to the first cross-member 72a with the tool 144 positioned within the positioning opening 124 and the positioning slot 142. In some cases, the positioning slot 142 is an opening of similar shape as the positioning opening 124.

Several embodiments have been discussed in the foregoing description. However, the embodiments discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

What is claimed is:

1. A patient transport apparatus comprising:
   a support structure;
   a support wheel coupled to the support structure, with the support wheel being swivelable about a swivel axis; and
   an auxiliary wheel system including:
      a support frame coupled to the support structure;
      an auxiliary wheel assembly with a wheel support frame coupled to the support frame, the auxiliary wheel assembly including an auxiliary wheel coupled to the wheel support frame and configured to influence motion of the patient transport apparatus over a floor surface, the auxiliary wheel assembly being positionable to a deployed position with the auxiliary wheel engaging the floor surface and a stowed position with the auxiliary wheel spaced a distance from the floor surface;
      a lift actuator operable to move the auxiliary wheel to the deployed position and to the stowed position;
      a biasing device arranged to urge the wheel support frame away from the support frame to bias the auxiliary wheel towards the deployed position; and
      a biasing load adjustment assembly for adjusting a biasing force being applied by the biasing device to the auxiliary wheel, the biasing load adjustment assembly including a slider block slideably coupled to the support frame to contact the biasing device to adjust a load imparted on the wheel support frame by the biasing device.

2. The patient transport apparatus of claim 1, wherein the support frame includes a first cross-member and a second cross-member spaced a distance from the first cross-member along a longitudinal axis, with the wheel support frame coupled to the first cross-member and to the auxiliary wheel for moving the auxiliary wheel between the stowed position and the deployed position.

3. The patient transport apparatus of claim 2, wherein the slider block is positionable along an outer surface of the first cross-member to contact the biasing device to adjust a load imparted on the wheel support frame by the biasing device.

4. The patient transport apparatus of claim 3, wherein the biasing load adjustment assembly includes:
   a positioning bracket coupled to the first cross-member; and
   a positioning assembly coupled to the positioning bracket and the slider block for adjusting a position of the slider block relative to the biasing device to facilitate adjusting the load imparted on the wheel support frame by the biasing device.

5. The patient transport apparatus of claim 4, wherein the positioning bracket includes a positioning opening extending through the positioning bracket, the positioning assembly extending through the positioning opening to contact the slider block.

6. The patient transport apparatus of claim 5, wherein the positioning assembly includes a positioning pin inserted through the positioning opening to contact the slider block to maintain a position of the slider block with respect to the biasing device.

7. The patient transport apparatus of claim 5, wherein the positioning assembly includes a positioning bolt extending through the positioning opening defined through the positioning bracket, the positioning bolt coupled to the slider block such that a movement of the positioning bolt causes a movement of the slider block.

8. The patient transport apparatus of claim 7, wherein the positioning assembly includes a positioning nut rotatably coupled to the positioning bolt to adjust a position of the positioning bolt with respect to the positioning bracket.

9. The patient transport apparatus of claim 8, wherein the positioning bolt includes a threaded outer surface, the positioning nut threadably coupled to the positioning bolt.

10. The patient transport apparatus of claim 9, wherein a rotation of the positioning nut in a first rotational direction moves the slider block towards the biasing device and a rotation of the positioning nut in a second rotational direction moves the slider block away from the biasing device.

11. The patient transport apparatus of claim 10, wherein the slider block is movable along an outer surface of the first cross-member in a first linear direction towards the biasing device and a second opposite linear direction away from the biasing device.

12. The patient transport apparatus of claim 11, wherein the rotation of the positioning nut in the first rotational direction moves the slider block in the first linear direction towards biasing device, and the rotation of the positioning nut in the second rotational direction moves the slider block in the second opposite linear direction away from the biasing device.

13. The patient transport apparatus of claim 1, wherein the biasing device extends between a first end and a second end, the first end positioned in contact with the slider block and the second end positioned in contact with the wheel support frame.

14. The patient transport apparatus of claim 1, wherein the biasing load adjustment assembly includes:
   a positioning bracket coupled to the support frame; and
   a positioning assembly coupled to the positioning bracket and to the wheel support frame for adjusting a position of the wheel support frame with respect to the support frame.

15. The patient transport apparatus of claim 14, wherein the positioning assembly includes a positioning bolt extending through a positioning opening defined through the positioning bracket, the positioning bolt coupled to the wheel support frame such that a movement of the wheel support frame causes a movement of the positioning bolt.

16. The patient transport apparatus of claim 15, wherein the positioning assembly includes a positioning nut rotatably coupled to the positioning bolt to adjust a position of the positioning bolt with respect to the positioning bracket.

17. The patient transport apparatus of claim 16, wherein the positioning bolt includes a threaded outer surface, the positioning nut threadably coupled to the positioning bolt.

18. The patient transport apparatus of claim 17, wherein a rotation of the positioning nut in a first rotational direction moves the wheel support frame towards the support frame and a rotation of the positioning nut in a second rotational direction moves the wheel support frame away from the support frame.

19. The patient transport apparatus of claim 1, wherein the biasing load adjustment assembly includes a support bracket extending outwardly from the support frame towards the wheel support frame, the support bracket including a positioning opening extending therethrough; and
   wherein the wheel support frame includes a positioning slot orientated with respect to the positioning opening such that a tool may be removably inserted through the positioning opening and the positioning slot to prevent a movement of the wheel support frame with respect to the support frame.

20. The patient transport apparatus of claim 1, wherein the biasing device includes a torsion spring in contact with the wheel support frame to bias the wheel support frame away from the support frame.

\* \* \* \* \*